United States Patent [19]

Lederman

[11] Patent Number: 4,606,449
[45] Date of Patent: Aug. 19, 1986

[54] HYDRAULIC CLUTCH RELEASE MECHANISM

[75] Inventor: Frederick E. Lederman, Sandusky, Ohio

[73] Assignee: General Motors Corporation, Detroit, Mich.

[21] Appl. No.: 742,424

[22] Filed: Jun. 7, 1985

[51] Int. Cl.⁴ .................. F16D 25/04; F16D 25/08; F16D 13/75
[52] U.S. Cl. .................................. 192/91 A; 192/98; 192/85 CA; 192/88 A
[58] Field of Search ................ 192/91 A, 98, 85 CA, 192/110 B, 88 A; 92/13.1, 13.2, 98 D; 91/216 R

[56] References Cited

U.S. PATENT DOCUMENTS

| | | | |
|---|---|---|---|
| 2,668,610 | 2/1954 | Backus | 192/110 B X |
| 2,717,680 | 9/1955 | Smith | 192/91 A |
| 2,757,769 | 8/1956 | Roise | 192/91 A |
| 3,955,660 | 5/1976 | Poon et al. | 192/91 A |
| 4,051,937 | 10/1977 | Garrett et al. | 192/88 A |
| 4,482,040 | 11/1984 | Brandenstein et al. | 192/88 A |
| 4,561,531 | 12/1985 | Young et al. | 192/91 A X |
| 4,567,812 | 2/1986 | Weiler et al. | 92/98 D X |

FOREIGN PATENT DOCUMENTS

| | | |
|---|---|---|
| 74671 | 3/1983 | European Pat. Off. . |
| 2348044 | 4/1974 | Fed. Rep. of Germany . |
| 2923487 | 12/1980 | Fed. Rep. of Germany . |
| 1207284 | 9/1970 | United Kingdom . |

Primary Examiner—Kenneth J. Dorner
Assistant Examiner—David A. Testardi
Attorney, Agent, or Firm—Patrick M. Griffin

[57] ABSTRACT

A hydraulic release mechanism of the bellows type provides for a constant volume of hydraulic fluid, thereby allowing a bellows of minimum size to be used. A housing is slidably supported on a transmission mounted guiding member for movement between the transmission and the fingers of diaphragm spring. A piston also slidably supported on the guiding member is receivable within the housing, with a housing attached flexible bellows engaged therebetween. A coil spring continually biases the housing and piston together and toward the spring fingers. The continual bias keeps the piston lightly engaged with the spring fingers, and keeps the housing at an operative position on the guiding member where the bellows is maintained in a constant volume unexpanded state. A flexible collet is flexed into the guiding member when the bellows begins to expand, anchoring the housing at its operative position. The anchoring allows the same volume of additional hydraulic fluid to expand the bellows sufficiently to move the piston, compress the spring fingers, and release the clutch.

3 Claims, 4 Drawing Figures

HYDRAULIC CLUTCH RELEASE MECHANISM

This invention relates to clutch release mechanisms in general, and specifically to an improved hydraulic clutch release mechanism that provides for a constant volume of hydraulic fluid throughout the life of the clutch.

BACKGROUND OF THE INVENTION

Conventional hydraulic clutch release mechanisms generally include a hydraulic fluid reservoir connected to a master cylinder. Hydraulic fluid is forced from the master cylinder, as clutch pedal is depressed, into an expandable fluid chamber in a slave cylinder. Expansion of the fluid chamber moves a piston out of the slave cylinder, which is fixed relative to a transmission casing. The moving piston compresses the fingers of a diaphragm-type clutch release spring to disengage the clutch. Generally, the spring fingers are in the form of levers that give a mechanical advantage to the motion of the piston. The position of the spring fingers, relative to the transmission casing when the clutch is engaged, is determined by how much wear has occurred to the friction disk of the clutch. Because of the mechanical advantage of the spring fingers, clutch wear may translate into a significant progressive shifting of the clutch engaged position of the fingers throughout the life of the clutch. The part of the mechanism that directly engages the spring fingers is generally a bearing mounted to the front of the piston. The bearing should be maintained in a continual light engagement with the spring fingers when they are in the clutch engaged position. This assures that the piston will be ready to compress the spring fingers with no lost motion when the clutch pedal is depressed. Since the slave cylinder is fixed relative to the transmission, the position of the piston in the slave cylinder and, therefore, the volume of hydraulic fluid in the fluid chamber, will have to vary as the clutch wears throughout its life. Since the spring fingers generally are designed to move closer to the transmission casing with clutch wear, a provision is usually made for extra volume in the slave cylinder at the beginning of clutch life. Then, fluid is allowed to return to the reservoir as the clutch wears. Providing for a constant volume of hydraulic fluid within the mechanism independent of clutch wear would obviate this design consideration.

Conventional hydraulic release mechanisms also require moving seals between the piston and the slave cylinder to prevent leakage of hydraulic fluid, and these seals are subject to wear with time. One solution is to form the expandable fluid chamber with a flexible bellows. The fluid chamber then expands as the bellows expands, with no moving seal. Examples of hydraulic release mechanisms of may be found in the U.S. patent to Garrett et al, U.S. Pat. No. 4,51,937 and in European Patent EP No. 0 074 6781 A1. In the mechanisms there disclosed, the expansion of the fluid chamber formed by the bellows pushes a piston, or similar release member, toward the spring fingers. The bellows forms convolutions about the piston, which roll out as the moving piston compresses the spring fingers. However, release mechanisms of the bellows type are also subject to the change in volume caused by the clutch wear discussed above, because the bellows is generally fixed relative to the transmission. This may present special problems in this type of mechanism, beyond the necessity of providing for extra volume in the fluid chamber. Providing such extra volume entails larger bellows sizes and longer convolution lengths therewithin. This may cause extra strain in the rolling convolutions, and the potential for stretching of the bellows material and lost work increases with bellows size. A constant volume could be even more beneficial, then, with the bellows type of hydraulic release mechanism.

SUMMARY OF THE INVENTION

The subject invention provides an improved hydraulic release mechanism in which the volume of hydraulic fluid remains constant throughout the life of the clutch. It finds special utility in the bellows type of clutch release mechanism.

The invention is disclosed for use with a clutch of the type in which a clutch member, a diaphragm type clutch release spring having compressible fingers, is moved from a clutch engaged to a clutch disengaged position by a release member of the release mechanism. The clutch engaged position of the spring fingers shifts progressively as the clutch wears throughout its life, moving progressively closer to a casing of the transmission. In the embodiment disclosed, a cylindrical guiding member, known as a quill, is fixed to the transmission casing, extending from the casing toward the spring fingers.

A housing has a central opening sized to fit slidably over the guiding quill. The housing is thus supported on the quill for guided movement between the transmission casing and the fingers of the clutch spring. A hose fitting on the housing allows hydraulic fluid to be introduced therethrough. Attached to the inside of the housing is a flexible bellows that forms an expandable fluid chamber therewithin to receive the hydraulic fluid. Attached to the edge of the housing central opening is a flexible cylindrical rubber collet that surrounds the surface of the guiding quill with a small clearance.

The release member of the release mechanism is a piston that includes a cylindrical guide portion, also sized to fit slidably over the guiding quill. The piston is thus also supported on the quill for guided movement. A bearing is mounted to the front of the piston guide portion to directly engage the spring fingers. The piston also includes a cylindrical body portion that fits within the housing and forms an annular space with the cylindrical collet. The expansion of the flexible bellows, described more fully below, moves the piston out of the housing, guided by the quill, to compress the spring fingers and release the clutch.

A resilient means in the form of a compression spring surrounding the quill is biased between the transmission casing and the back of the housing. The compression spring forces the housing into the piston body portion, engaging the flexible bellows therebetween. In turn, the bearing is maintained in light engagement with the spring fingers in their clutch engaged position, ready to compress the spring fingers. Furthermore, the bellows, by being engaged between the piston and housing, is conformed around the body portion of the piston with an annular fold contained in the space between the body portion and the collet. As the spring fingers shift closer to the transmission casing with clutch wear, the coil spring compresses farther to allow the piston and housing to move along the guiding quill toward the transmission casing. This sliding movement maintains the piston, housing, flexible bellows and spring fingers in the same relative position, while maintaining the bearing lightly engaged with the spring fingers.

By maintaining the piston, housing and flexible bellows in the same relative position, the compression spring also maintains the fluid chamber formed by the bellows in an unexpanded state with an initial volume that is constant. The position maintained by the housing may be defined as an operative position, and it moves relative to the transmission along the guiding quill as the clutch engaged position of the spring fingers progressively shifts. The invention allows the housing to be fixed at this operative position as hydraulic fluid is introduced into the fluid chamber in its unexpanded state. By so fixing the operative position, the addition of the same volume of hydraulic will sufficiently expand the fluid chamber from its initial volume to, in turn, move the piston sufficiently along the guiding quill to disengage the clutch. Therefore, there will be a constant total volume of hydraulic fluid within the release mechanism throughout the life of the clutch, and a bellows of minimum size may be used.

When hydraulic fluid is introduced into the fluid chamber in its unexpanded state, the fluid chamber and flexible bellows expand together. As the bellows begins to expand, the fold thereof expands also and forces the collet into the surface of the guiding quill. Sufficient friction is provided between the collet and surface of the guiding quill to anchor the collet, and housing, with respect to the quill, thereby fixing the operative position of the housing. Therefore, a constant total volume of fluid is possible, as described above. In addition, the embodiment disclosed may be easily retrofitted to clutches having a conventional mechanical release mechanism that is guided by a similar guiding member or quill.

It is, therefore, a broad object of the invention to provide a hydraulic clutch release mechanism having a constant volume of hydraulic fluid therewithin independent of the progressive shifting of the clutch engaged position of a clutch member relative to a transmission with clutch wear, a clutch member that is moved from its clutch engaged position by an expandable fluid chamber of the release mechanism to disengage the clutch.

It is another object of the invention to provide such a constant volume release mechanism having a housing movable between the transmission and the clutch member and including a fluid chamber therewithin expandable to move a release member toward the clutch member, with a resilient means biased between the transmission and the housing to move the housing toward the release member to both maintain the housing at an operative position where the release member lightly engages the clutch member and to maintain the fluid chamber in an unexpanded sate with a constant initial volume, with an anchoring means operable when fluid is introduced to the fluid chamber to fix the operative housing position so that the addition of the same volume of fluid to the fluid chamber will expand it sufficiently to move the release member and disengage the clutch, thereby allowing for a constant total volume of fluid in the mechanism.

It is a further object of the invention to provide a constant volume release mechanism of the type described in which the release member and housing are slidably supported for guided movement on a guiding member fixed to the transmission, and in which the anchoring means is cooperable with the guiding member to fix the operative position of the housing relative to the guiding member, whereby the release mechanism may easily be used in place of conventional release mechanisms used in conjunction with a similar guiding member.

DESCRIPTION OF THE PREFERRED EMBODIMENT

These and other objects and features of the invention will appear from the following written description and drawings in which.

Figure 1:
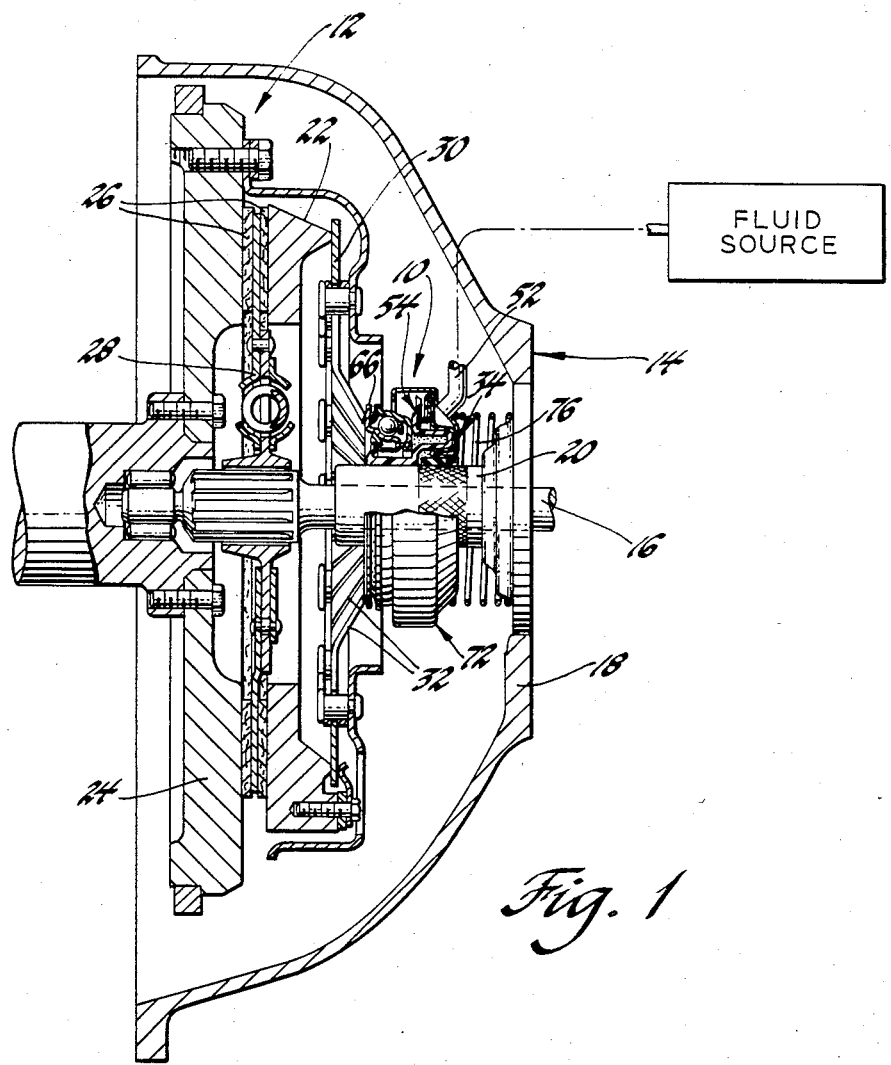
FIG. 1 is a cross sectional view of a clutch and transmission showing the hydraulic clutch release mechanism of the invention partially broken away.

Referring first to FIG. 1, the hydraulic release mechanism of the invention, designated generally at 10, is shown in conjunction with a clutch, designated generally at 12, and a transmission, designated generally at 14. Transmission 14 includes a shaft 16 and a casing 18. A cylindrical guiding member 20, known as a quill, is fixed to transmission casing 18 in surrounding relation to shaft 16. Quill 20 extends toward a clutch member, described below, and acts as a guide for release mechanism 10. Similar guiding quills 20 may be found in conjunction with conventional mechanical clutch release mechanisms.

Clutch 12 is conventional, and includes a pressure plate 22 and a flywheel 24. Wearable friction disks 26 mounted on a clutch plate 28 are grasped between pressure plate 22 and flywheel 24. A clutch member, here a diaphragm spring designated generally at 30, is movable by release mechanism 10 from a FIG. 3 clutch engaged position to a FIG. 4 clutch disengaged position. So moving diaphragm spring 30 frees friction disks 26, thereby stopping the input of torque from flywheel 24 to clutch plate 28 and transmission shaft 16. Diaphragm spring 30 is moved by the compression of radial spring fingers 32, which will be more fully described below. However, it will be understood that the fingers 32 are designed to act as levers and give a mechanical advantage to the action of release mechanism 10. Their clutch engaged position will be determined by how much wear has occurred to friction disks 26 at any point in the life of clutch 12.

Figure 2:
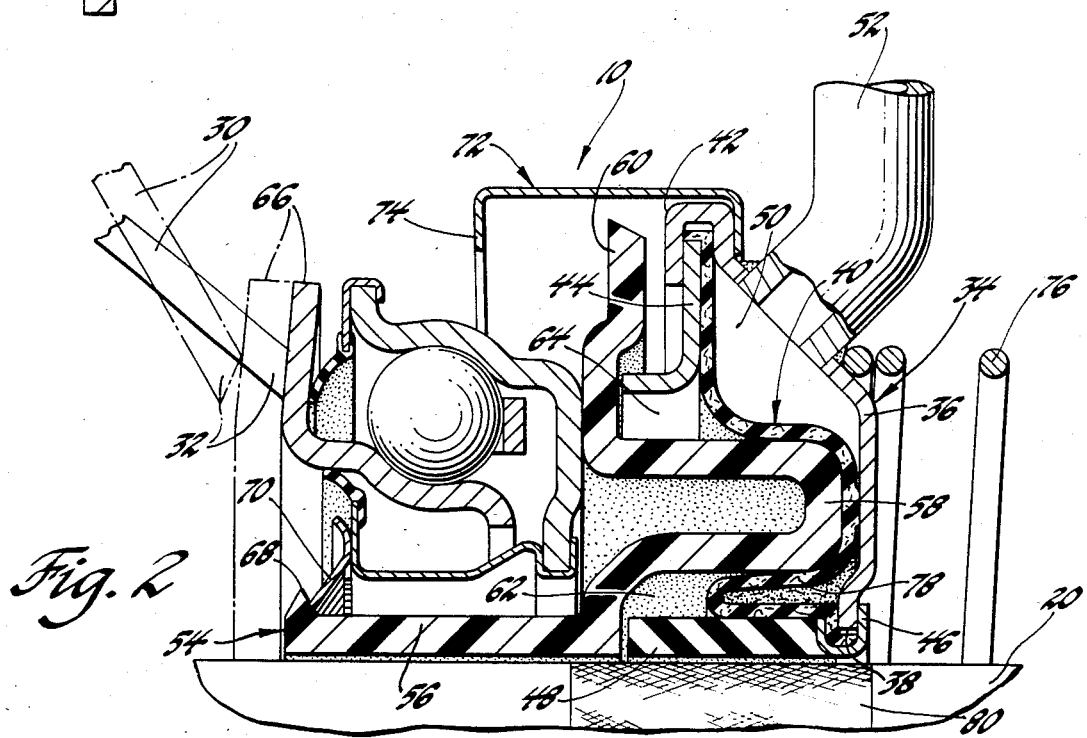
FIG. 2 is an enlarged view of a a portion of the invention and showing two different clutch engaged positions of the diaphragm spring fingers, an early position in dotted lines and a later position in solid lines, with the corresponding position of the front of the release mechanism also shown in dotted lines.

As a consequence of the mechanical advantage, the clutch engaged position of spring fingers 32 will shift progressively a significant amount relative to transmission 14 with clutch wear. For the clutch 12 shown here, the shifting is progressively toward transmission 14. This is best seen in FIG. 2, which shows a clutch engaged position of spring fingers 32 early in the life of clutch 12, as shown in FIG. 1, in dotted lines, with a later clutch engaged position shown in solid lines. Release mechanism 10 is operated by hydraulic fluid from a fluid source, introduced as a clutch pedal is depressed. The fluid source may be a conventional reservoir and master cylinder, and it is shown only diagrammatically.

The invention provides for a constant volume of hydraulic fluid in the release mechanism 10 as the friction disks 26 wear throughout the life of clutch 12. Therefore, no provision for extra fluid capacity or for the return of extra fluid to the fluid source need be made.

Details of the release mechanism 10 may be seen in FIG. 2. It will be understood that release mechanism 10 is generally symmetrical about the coaxis of quill 20 and shaft 16, so that only the one side need be illustrated. A stamped metal housing, designated generally at 34, includes a generally dish shaped wall 36 with a circular central opening 38 through which quill 20 passes. A flexible bellows, designated generally at 40, is molded from a suitable elastomer, and may be cloth reinforced. In its free molded state, not shown, bellows 40 would also be generally dish shaped. The radially outer edge of housing wall 36 is crimped at 42 over the radially outer edge of bellows 40 so as to be fluid tight. A bellows guide 44 of generally L-shaped cross section is also conjoined to housing wall 36 at 42, for a purpose described below.

The radially inner edge of bellows 40 is attached so as to be fluid tight to the edge of opening 38 by a crimped metal ring 46. Ring 46, in effect, extends the edge of opening 38 radially inwardly, and has a small clearance with the surface of quill 20. Housing 34 is thus supported to slide on quill 20 and move between diaphragm spring 30 and transmission casing 18. A cylindrical rubber collet 48, which also surrounds quill 20 with a slight clearance, is molded to metal ring 46. Collet 48, therefore, is fixed to and movable with housing 34, and serves a purpose further described below. Because of its fluid tight attachment, bellows 40 forms an expandable fluid chamber 50 within housing 34. A hose fitting 52 provides a means for introducing hydraulic fluid into fluid chamber 50.

The release member of the invention is a molded plastic piston, designated generally at 54. Piston 54 includes cylindrical guide portion 56 that fits over quill 20 with a small clearance. Like housing 34, piston 54 is thereby slidably supported on quill 20 for guided movement. A piston body portion 58 has the general shape of a double walled cylinder, and is integral with a radial wall 60. Piston body portion 58 is receivable within housing 34, and forms an annular space 62 with collet 48 and an annular space 64 with bellows guide 44. A sealed bearing 66 is mounted to the front of guide portion 56 and is engagable with spring fingers 32. Bearing 66 is biased between a circular rib 68 and piston radial wall 60 by a resilient washer 70, in conventional fashion, to allow radial self-alignment relative to spring fingers 32. A cylindrical sheet metal casing, designated generally at 72, is crimped over the radially outer edge of housing wall 36. Metal casing 72 shields piston 54 from contaminants, and includes an inturned stop flange 74 that is engagable with radial wall 60, for a purpose be described below.

Completing the construction of release mechanism 10, a resilient means is biased between transmission 14 and the housing 34. In the embodiment disclosed, the resilient means is a compression coil spring 76 coaxially surrounding quill 20 and biased between transmission casing 18 and the back of housing wall 36. Coil spring 76 continually presses on and moves housing 34 toward the spring fingers 32. That movement stops when housing wall 36 hits the back of piston body portion 58, with bellows 40 engaged therebetween. In turn, guide portion 56 slides along quill 20 until bearing 66 engages spring fingers 32 at their clutch engaged position. The force of coil spring 76 is balanced with the resilience of spring fingers 32 to keep bearing 66 lightly engaged therewith. Since spring fingers 32 rotate rapidly with clutch 12, torque may be transferred from bearing 66 to piston 54 and to housing 34. To compensate for this, the back of piston body portion 58 may be taped or glued to bellows 40, and coil spring 76 may be fixed between housing wall 36 and transmission casing 18 so as to prevent housing 34 from turning.

The light engagement of bearing 66 with spring fingers 32 maintained by the force balance of spring fingers 32 and coil spring 76 maintains housing 34, piston 54, bellows 40 and spring fingers 32 at the same position relative to each other as clutch 12 wears. With additional clutch wear, the clutch engaged position of spring fingers 32 will shift toward transmission casing 18 from the dotted to the solid line position of FIG. 2. As spring fingers 32 so shift, coil spring 76 will compress farther to allow housing 34 and piston 54 to slide back on quill 20 to the solid line position. The position so maintained for housing 34, relative to transmission casing 18, may be defined as its operative position. The position so maintained for piston 54 may be referred to as its ready position. The engagement of bellows 40 between housing wall 36 and piston body portion 58 also maintains bellows 40 in its FIG. 2 configuration. As piston body portion 58 presses into bellows 40, it conforms bellows 40 around piston body portion 58 with a fold 78 contained in annular space 62. The shape of bellows 40 so maintained defines an unexpanded state of expandable fluid chamber 50, with an initial volume that is constant at every operative position of housing 34. The operation of release mechanism may now be understood by referring to FIGS. 3 and 4.

Figure 3:
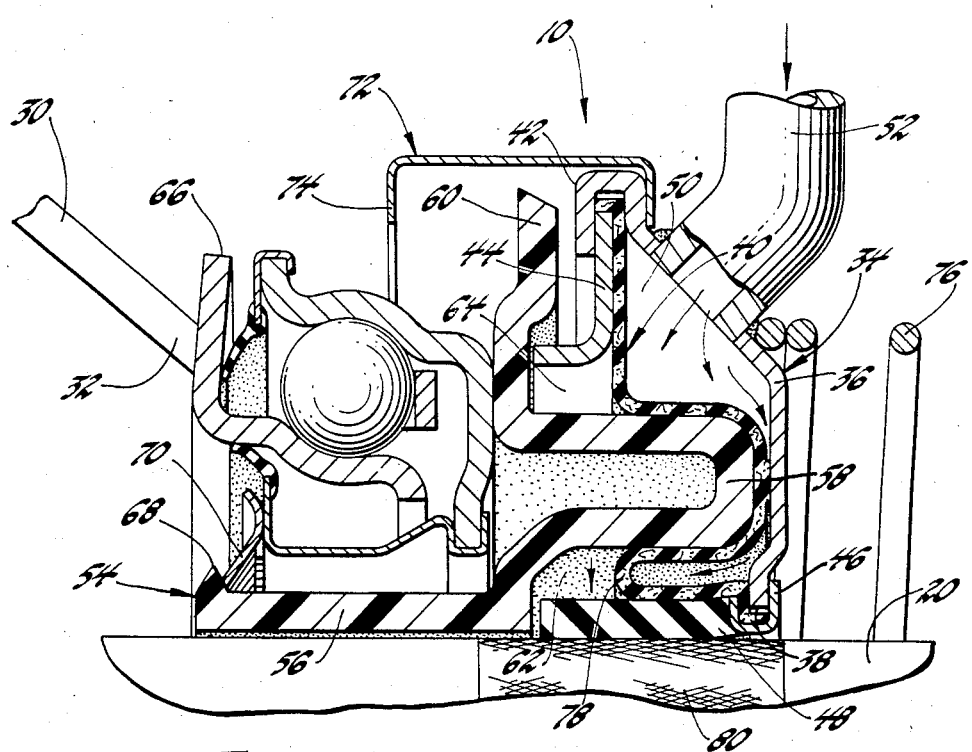
FIG. 3 is a view showing the release mechanism at the FIG. 2 solid line position with hydraulic fluid being added to the release mechanism.

Referring first to FIG. 3, housing 34 is shown at the same operative position as the solid line position of FIG. 2. There will be an initial volume of hydraulic fluid in fluid chamber 50 in its unexpanded state. Additional, pressurized hydraulic fluid is then introduced to fluid chamber 50, generally as a clutch pedal is depressed, the flow of which is represented by arrows. The initial introduction of this additional hydraulic fluid begins to expand bellows 40, including fold 78. This in turn flexes rubber collet 48 radially inwardly into the surface of quill 20. Rubber collet 48 has a high coefficient of friction and, additionally, the surface of quill 20 that it engages is knurled or otherwise roughened at 80. Consequently, collet 48 and the knurled surface 80 cooperate to fix or anchor housing 34 at its operative position.

Figure 4:
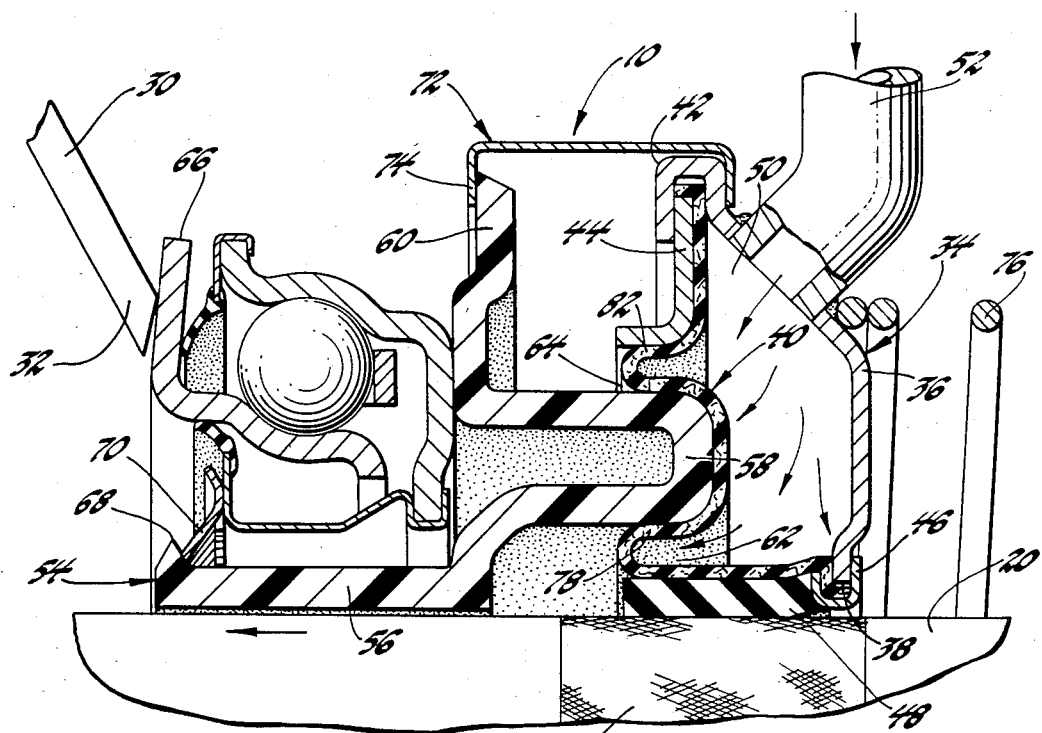
FIG. 4 is a view similar to FIG. 3, but showing the release member compressing the spring fingers.

Referring next to FIG. 4, the addition of more hydraulic fluid to fluid chamber 50 further expands it along with bellows 40. During this further expansion, fold 78 rolls out along collet 48, and an additional fold 82 forms between bellows guide 44 and piston body portion 58. Since housing 34 is anchored to quill 20, the expansion of bellows 40 will move piston 54 from its ready position, out of housing 34, and toward spring fingers 32. Piston 54 is guided as it moves along quill 20 by guide portion 56. As piston 54 moves, bearing 66 compresses spring fingers 32 until piston radial wall 60 engages stop flange 74. This engagement defines a release position of piston 54 at which point spring fingers 32 are sufficiently compressed to disengage clutch 12. Because housing 34 is anchored at its operative position, adding the same amount of hydraulic fluid to the initial volume of fluid in fluid chamber 50 will sufficiently expand it and bellows 40 to move piston 54 to its release position. Consequently, the total volume of hydraulic fluid in release mechanism 10, that is, its initial volume plus the additional volume added, will also be constant.

Besides the benefit of the constant volume of fluid itself, there are additional benefits in the embodiment disclosed. With a constant volume, a bellows 40 of minimum size may be used. Besides cost savings, the necessary axial length of the folds in the bellows is reduced, and these folds are subject to the greatest stress. Reducing the overall size of the bellows 40 also reduces the potential for stretching the bellows as it expands, with consequent lost work. The embodiment disclosed is easily retrofitted to vehicles having a similar guiding member or quill 20. This is because the piston 54, housing 34 and collet 48 are all slidably supported on and guided by quill 20, and coil spring 76 surrounds quill 20. Therefore, all the parts of the invention may be easily added to quill 20 in place of a conventional mechanical release mechanism.

Variations in the disclosed embodiment may be made, especially in the anchoring means, which fixes the operative position of the housing 34. While quill 20 is shown as being knurled at 80, it is conceivable that a material with a sufficient coefficient of friction could be used in collet 48 to work with a smooth quill surface. A frictional coating on the surface of bellows 40 itself could eliminate the need for a separate collet 48. A large anchoring force could be achieved by providing interfittable circumferential ribs on the inside surface of collet 48 and on that portion of quill 20 that is shown as knurled at 80. The ribs would engage as the collet 48 flexed radially inwardly. The clearance of ring 46 could be decreased relative to the clearance of collet 48 so as to assure that that the ribbed collet did not engage when it was unflexed. Whatever anchoring means is used, the release mechanism 10 will provide the benefits noted above. Therefore, it will be understood that the invention is not intended to be limited to that embodiment disclosed.

The embodiments of the invention in which an exclusive property or privilege is claimed are defined as follows:

1. A hydraulic clutch release mechanism of the type in which hydraulic fluid is introduced into a fluid chamber to expand it from an unexpanded state to move a clutch member from a clutch engaged to a clutch disengaged position relative to a transmission, said clutch being of the type in which said clutch engaged position of said clutch member shifts progressively relative to said transmission as said clutch wears throughout the life of the clutch, said mechanism providing for a constant volume of hydraulic fluid within said mechanism throughout the life of the clutch, comprising, a housing movable between said clutch member and transmission within which said expandable fluid chamber is located and including means for the introduction of hydraulic fluid to said fluid chamber, a release member movable relative to said housing toward said clutch member by the expansion of said fluid chamber, resilient means biased between said transmission and housing to move said housing toward said clutch member and to maintain said housing at an operative position with respect to said clutch member so that said release member lightly engages said clutch member at every clutch engaged position throughout the life of the clutch and to maintain said fluid chamber in said unexpanded state with an initial volume that is constant at said operative position, and, anchoring means operable upon the initial introduction of hydraulic fluid to said fluid chamber at its initial volume to fix said housing at said operative position, whereby the same volume of hydraulic fluid may be introduced to said fluid chamber to expand it sufficiently from said initial volume to thereby move said release member toward said clutch member sufficiently to move said clutch member to its clutch disengaged position, thereby providing for a constant total volume of fluid within said mechanism throughout the life of the clutch.

2. A hydraulic clutch release mechanism of the type in which hydraulic fluid is introduced into a fluid chamber formed by a flexible bellows to expand said fluid chamber from an unexpanded state to move a clutch member from a clutch engaged to a clutch disengaged position relative to a transmission, said clutch being of the type in which said clutch engaged position of said clutch member shifts progressively relative to said transmission as said clutch wears throughout the life of the clutch, said mechanism providing for a constant volume of hydraulic fluid within said mechanism throughout the life of the clutch as well as allowing a flexible bellows of minimum size to be used, comprising, a housing movable between said clutch member and transmission within which said flexible bellows is attached so as to form said expandable fluid chamber, said housing further including means for the introduction of hydraulic fluid to said fluid chamber, a release member movable relative to said housing toward said clutch member by the expansion of said fluid chamber and bellows, resilient means biased between said transmission and housing to move said housing toward said clutch member and to maintain said housing at an operative position with respect to said clutch member so that said release member lightly engages said clutch member at every clutch engaged position throughout the life of the clutch, said resilient means also engaging said flexible bellows between said housing and said release member so as to maintain the fluid chamber formed by said bellows in said unexpanded state with an initial volume that is constant at said operative position, and, anchoring means operable upon the initial introduction of hydraulic fluid to said fluid chamber at its initial volume to fix said housing at said operative position, whereby the same volume of hydraulic fluid may be introduced to said fluid chamber to expand it sufficiently from said initial volume to thereby move said release member toward said clutch member sufficiently to move said clutch member to its clutch disengaged position, thereby providing for a constant total volume of fluid within said mechanism throughout the life of the clutch and also allowing said fluid chamber to be formed by a flexible bellows of minimum size.

3. A hydraulic clutch release mechanism for use with a clutch of the type having a guiding member fixed to a transmission and extending toward a clutch member, and in which hydraulic fluid is introduced into a fluid chamber to expand it from an unexpanded state to move the clutch member from a clutch engaged to a clutch disengaged position relative to a transmission, said clutch being of the type in which said clutch engaged position of said clutch member shifts progressively relative to said transmission as said clutch wears throughout the life of the clutch, said mechanism providing for a constant volume of hydraulic fluid within said mechanism throughout the life of the clutch, comprising

- a housing within which said expandable fluid chamber is located, said housing being slidably supported on said guiding member so as to be movable between said clutch member and transmission, said housing further including means for the introduction of hydraulic fluid to said fluid chamber,
- a release member slidably supported on said guiding member so as to be movable relative to said housing toward said clutch member by the expansion of said fluid chamber,
- resilient means biased between said transmission and housing to move said housing on said guiding member toward said clutch member and to maintain said housing at an operative position with respect to said clutch member so that said release member lightly engages said clutch member at every clutch engaged position throughout the life of the clutch and to maintain said fluid chamber in said unexpanded state with an initial volume that is constant at said operative position, and,
- anchoring means cooperable between said housing and said guiding member and operable upon the initial introduction of hydraulic fluid to said fluid chamber at its initial volume to fix said housing to said guiding member at said operative position, whereby the same volume of hydraulic fluid may be introduced to said fluid chamber to expand it sufficiently from said initial volume to thereby move said release member toward said clutch member sufficiently to move said clutch member to its clutch disengaged position, thereby providing for a constant total volume of fluid within said mechanism throughout the life of the clutch.

* * * * *